US007707036B2

(12) United States Patent
Suryanaraya

(10) Patent No.: US 7,707,036 B2
(45) Date of Patent: Apr. 27, 2010

(54) VOICE REVIEW OF PRIVACY POLICY IN A MOBILE ENVIRONMENT

(75) Inventor: Lalitha Suryanaraya, Austin, TX (US)

(73) Assignee: SBC Technology Resources Inc, Austin, TX (US)

( * ) Notice: Subject to any disclaimer, the term of this patent is extended or adjusted under 35 U.S.C. 154(b) by 0 days.

(21) Appl. No.: 11/715,207

(22) Filed: Mar. 7, 2007

(65) Prior Publication Data

US 2007/0156269 A1    Jul. 5, 2007

Related U.S. Application Data

(63) Continuation of application No. 09/683,331, filed on Dec. 14, 2001, now Pat. No. 7,206,744.

(51) Int. Cl.
H04L 12/66 (2006.01)
H04J 1/02 (2006.01)
H04M 11/04 (2006.01)
G10L 21/00 (2006.01)

(52) U.S. Cl. ............... 704/270.1; 370/352; 370/493; 455/404.1; 455/404.2

(58) Field of Classification Search ............... 704/270.1
See application file for complete search history.

(56) References Cited

U.S. PATENT DOCUMENTS

| 6,108,706 | A | 8/2000 | Birdwell et al. |
| 6,125,376 | A | 9/2000 | Klarlund et al. |
| 6,185,573 | B1 | 2/2001 | Angelucci et al. |
| 6,199,077 | B1 | 3/2001 | Inala et al. |
| 6,233,566 | B1 | 5/2001 | Levine et al. |
| 6,240,448 | B1 | 5/2001 | Imielinski et al. |
| 6,269,254 | B1 | 7/2001 | Mathis |
| 6,269,336 | B1 | 7/2001 | Ladd et al. |
| 6,275,693 | B1 | 8/2001 | Lin et al. |
| 6,278,993 | B1 | 8/2001 | Kumar et al. |
| 6,285,877 | B1 | 9/2001 | Liu et al. |
| 6,292,668 | B1 | 9/2001 | Alanara et al. |
| 6,298,045 | B1 | 10/2001 | Pang et al. |
| 6,571,279 | B1 | 5/2003 | Herz et al. |
| 6,985,865 | B1 | 1/2006 | Packingham et al. |
| 7,206,744 | B2 * | 4/2007 | Suryanaraya ............ 704/270.1 |
| 2002/0035474 | A1 * | 3/2002 | Alpdemir ................. 704/270 |
| 2003/0014654 | A1 * | 1/2003 | Adler et al. ................ 713/200 |
| 2003/0084300 | A1 * | 5/2003 | Koike ....................... 713/182 |
| 2003/0097383 | A1 * | 5/2003 | Smirnov et al. .......... 707/204 |

OTHER PUBLICATIONS

Roger Clarke's P3P Overview; "Platform for Privacy Preferences: An Overview", http://www.anu.edu.au/people/Poger.Clarke/DV/P3POview.html, 10 pages, (1998).

* cited by examiner

Primary Examiner—David R Hudspeth
Assistant Examiner—Justin W Rider
(74) Attorney, Agent, or Firm—Woodcock Washburn LLP

(57) ABSTRACT

Systems and methods for providing aural review of a privacy policy are disclosed. Generally, a first version of a privacy policy is retrieved. A natural language version of the privacy policy is then retrieved based on at least one user preference and an audio representation of the natural language version of the privacy policy is played through an audio system of a device to a user.

15 Claims, 9 Drawing Sheets

VOICE REVIEW OF PRIVACY POLICY IN A MOBILE ENVIRONMENT

RELATED APPLICATIONS

The present patent document is a continuation of U.S. patent application Ser. No. 09/683,331, filed Dec. 14, 2001 now U.S. Pat. No. 7,206,744, the entirety of which is hereby incorporated by reference.

BACKGROUND

With the rapidly increasing use of the Internet, Internet privacy is of increasing concern. Various owners of World Wide Web (Web) sites have different policies regarding the collection and use of an individual's private information. For example, one Internet merchant may share an individual's address, telephone number, and other personal information without asking the individual. Another Internet merchant may not sell any of the individual's personal information without asking.

Mobile data privacy will be a growing concern in the future as well. The FCC is requiring future mobile devices to be able to determine their geographic locations. This may be an item that the user does not wish to share with others.

A Web consortium recognized the importance of Internet privacy and generated a protocol for Internet products such as Internet browsers. The protocol provides Internet related companies with guidelines for privacy issues. The protocol is referred to in the art as Platform for Privacy Preferences or P3P.

P3P enables Web sites to specify their personal data use and disclosure practices and enables Web users to specify their expectations concerning personal data disclosure practices. Additionally, P3P provides software user agents with the ability to undertake negotiation, on behalf of the parties, in order to reach an agreement concerning the exchange of data between the parties. In other words, P3P provides a means whereby individuals can have sufficient information that he or she can make an informed decision regarding whether to permit use of their personal data or decline further use of that data. Furthermore, that decision can be delegated to the software user agent that is acting on behalf of the individual.

After reviewing the privacy policy of a Web site owner, the individual can accept or reject that policy based on his or her own preferences about sharing personally identifiable information with the Web site. This process may be automated by the Web site sending an extensible mark-up language (XML) file that asserts the policy of that particular Web site and is matched with the privacy preferences configured in the browser or other software product. This can be accomplished using capabilities that are well known in the art such as A P3P Preferences Exchange Language (APPEL).

Using this rules-based language, a user can express his or her preferences in a set of preference-rules called a ruleset. The ruleset is then used by a software agent to make automated or semi-automated decisions regarding the acceptability of machine-readable privacy policies from P3P enabled Web sites.

If the individual prefers to review the policy manually, they must request a download of the policy [via the P3P software agent or browser]. Typically, privacy policies are long and detailed and may consist of multiple paragraphs in different fonts.

A wireless mobile station (e.g., personal digital assistant, mobile telephone, data handset) user who is accessing a Web site is limited in reviewing a privacy policy manually. A policy might be difficult to read on a mobile device with a small screen. There is a resulting need for a way to review privacy policies on mobile devices.

DETAILED DESCRIPTION OF THE DRAWINGS

The present invention provides an architecture that combines technologies such as Wireless Access Protocol (WAP), P3P, voice XML (VXML), and Simple Object Access Protocol (SOAP) to enable a review of an Internet site's natural language (e.g., English, French) privacy policy via an aural interface. In the preferred embodiment, this is accomplished when accessing the Internet with a mobile station.

The WAP, VXML, and SOAP protocols discussed herein are well known in the art. Further disclosure regarding these protocols can be found on the Internet at "www.wapforum.org", www.w3.org, and "www.w3.org/2000/xp/Group/1/11/19/UsageScenarios".

Figure 1:
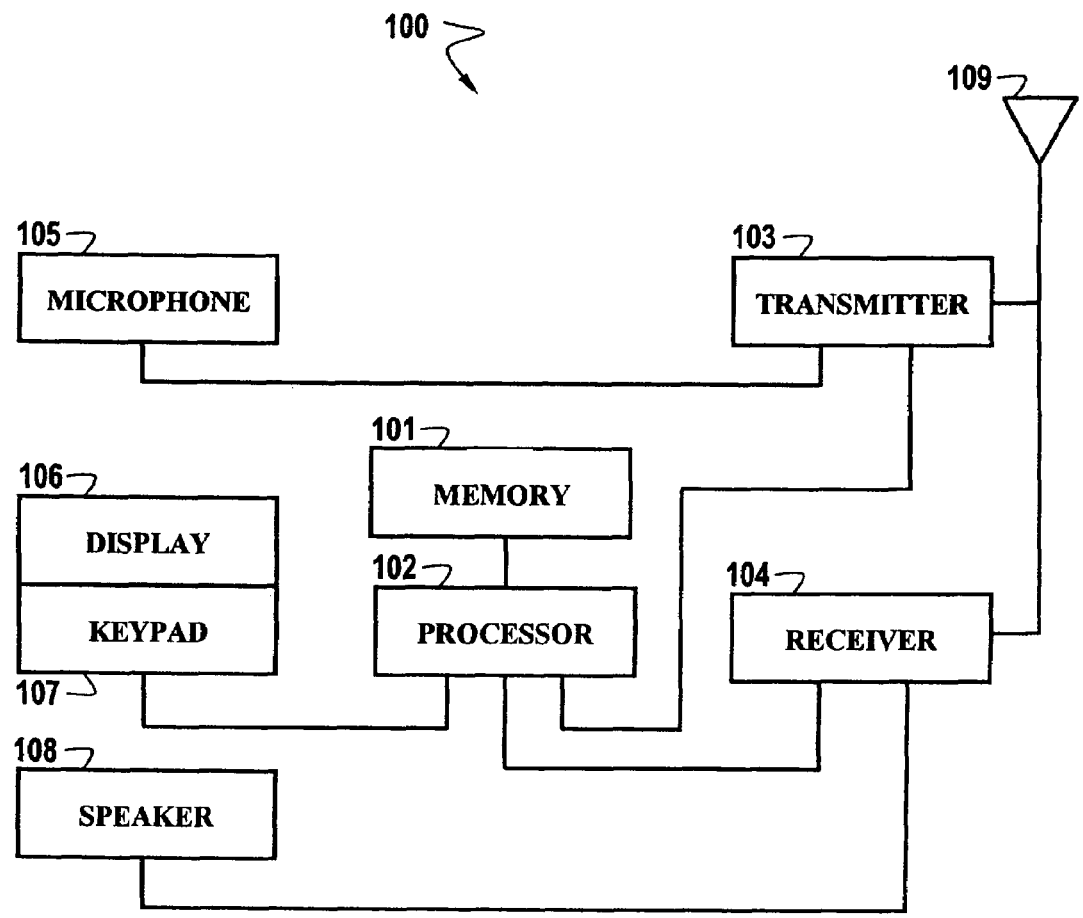
FIG. 1 shows a block diagram of a wireless device in accordance with the present invention.

FIG. 1 illustrates a block diagram of a typical wireless device (100) or mobile station. The device (100) is comprised of a microphone (105) for converting a voice signal to an electrical signal for transmission by the transmitter (103) and radiated over the antenna (109). Signals received by the antenna (109) are received and demodulated by the receiver (104) before being converted to an aural signal by the speaker (108).

The transmitter (103) and receiver (104) blocks represent the circuitry required for analog-to-digital conversion, digital-to-analog conversion, modulating, demodulating, and any other task required by the air interface standard (e.g., CDMA, TDMA, GSM) for which the wireless device is designed. The present invention is not limited to any one air interface standard.

The device user inputs information and operates the device by the keypad (107). The keypad (107) can be used to input dual-tone multi-frequency (DTMF) responses. The display (106) shows the user what was input on the keypad (107) as well as information that was received by the receiver (104).

A processor (102) that is coupled to memory (101) controls the wireless device (100). The processor scans the keypad (107) for inputs, displays appropriate data on the display (106), and controls the transmission and reception of data.

The processor (102) is also responsible for operating any processes used by the device. In the preferred embodiment, the processor runs a Web browser-type process, referred to as the user agent, that communicates data over the Internet. The P3P-enabled Web user agent is responsible for interacting with the World Wide Web and Internet such as sending and retrieving e-mails, accessing and rendering Web content, and sending information to a Web site.

The user agent is a smaller version of the Web browser programs written for personal computers. These include programs such as MICROSOFT INTERNET EXPLORER and NETSCAPE NAVIGATOR. The user agent for the WAP-capable device is required to be smaller in size in order to fit in the memory of the device. The user agent must also download and render Web content equivalents (such as decks and cards) for a substantially smaller screen on the device than that used in a typical personal computer. The user agent is well known in the art and is not discussed further herein.

The P3P-enabled user agent process of the present invention is also responsible for enabling the end user to enter privacy policy preferences and compare these preferences with the privacy policy of a particular Web site. As described subsequently, the comparison may trigger a notification to the user that the full privacy policy should be reviewed.

While the preferred embodiment of the present invention is described as using wireless device (100) of FIG. 1, other types of wireless communication devices also operate effectively with the process of the present invention. Alternate embodiments include a personal digital assistants (PDA) and cellular telephones. In one such embodiment, the wireless device is WAP-enabled.

Figure 2:
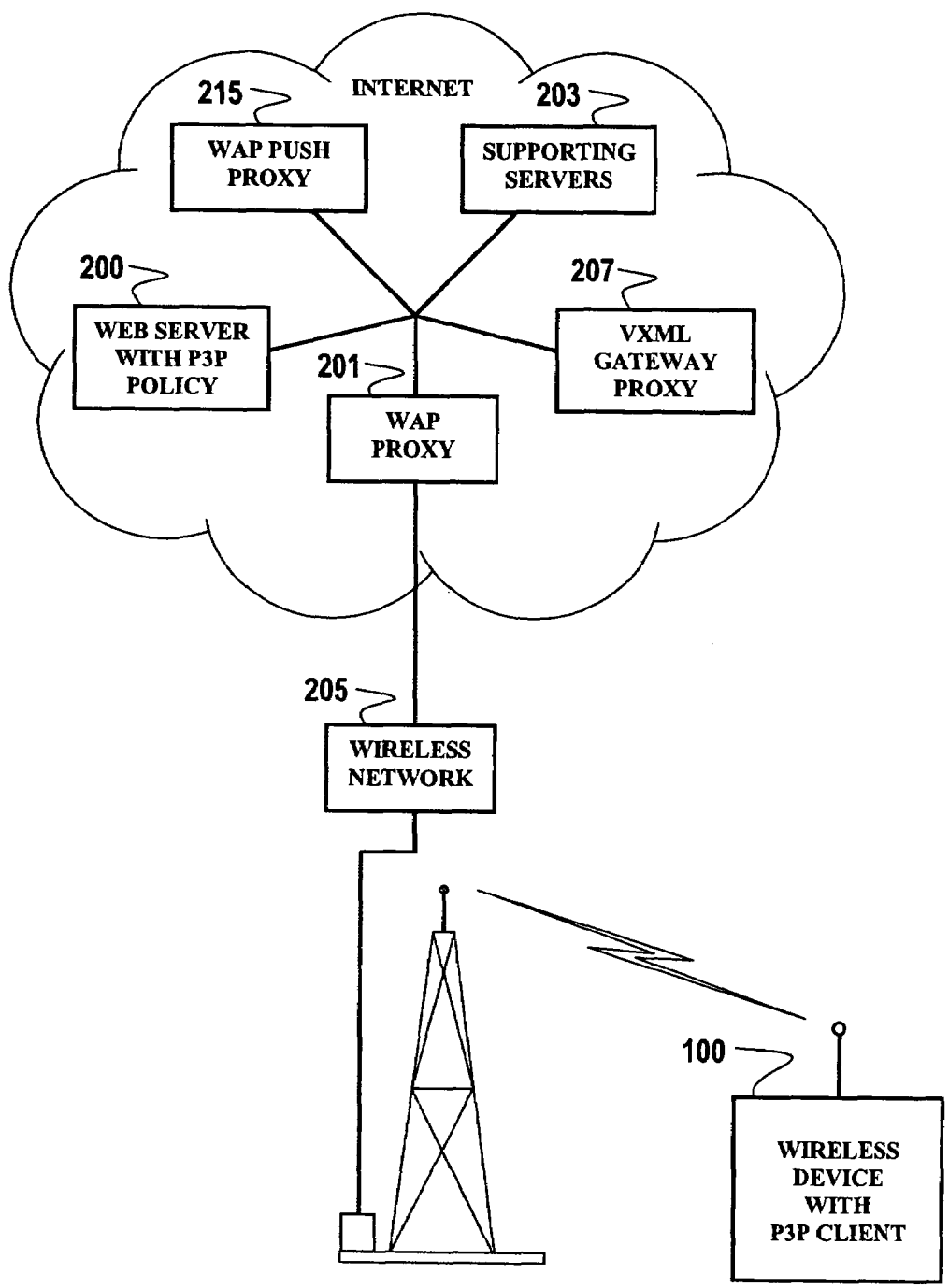
FIG. 2 shows a block diagram of a network of the present invention.

FIG. 2 illustrates a block diagram of a network of the present invention. The network is illustrated as being comprised of WAP components that interact with a WAP-capable wireless device. The present invention, however, is not limited to WAP technology. The network of FIG. 2 is for illustration purposes only since a WAP-enabled wireless device in a WAP network is only one embodiment of the privacy policy review process of the present invention.

The network of FIG. 2 is comprised of the wireless device (100) that is illustrated in FIG. 1. The wireless device (100) communicates with the wireless network (205). In the preferred embodiment, the wireless network is a cellular network.

As is well known in the art, the wireless network (205) is comprised of a large number of fixed antennas coupled to low power transmitters. Each antenna radiates into a segmented 360-degree area. The number of segments depends on the number of directional antennas employed. Examples of such networks are the AMPS cellular network, the GSM cellular network, and the CDMA PCS networks. The wireless network of the present invention is well known in the art and its operation is not discussed further.

The present invention assumes that the wireless device is capable of data sessions and the networks can support such technologies. One example is a GPRS class B device. Another embodiment includes an all IP network that can also support voice over IP.

Alternate embodiments of the present invention use other forms of wireless communication networks besides cellular or PCS. For example, a series of omni-directional antennas located in a geographical area and communicating with wireless devices would perform substantially the same communication function as the cellular system of the preferred embodiment.

Referring again to FIG. 2, the wireless network (205) allows the wireless device (100) to communicate with a WAP Proxy (201). As is well known in the art, a proxy is an intermediary program that acts as both a server and a client for the purpose of making requests on behalf of other clients, such as the wireless device (100) in the present embodiment. The proxy typically resides between clients and servers that may have no means of direct communication (e.g., across a firewall). Requests are either serviced by the proxy program or passed on, with possible translation, to other servers. The WAP gateway function of the WAP proxy enables protocol conversion such as from WAP WSP to HTTP and vice versa.

In the present embodiment, the WAP Proxy (201) translates the WSP or W-HTTP requests from the wireless device (100) to the protocol used by the World Wide Web. This allows the wireless device (100) to submit requests for information to the supporting Web servers (303). The WAP Proxy (201) may also encode as necessary the responses from the Web servers (203) into the compact binary format understood by the wireless device (100).

In the embodiment of FIG. 2, WAP-capable devices access Web servers that communicate using HTTP in order to render content that is marked up using XHTML, XHTML mobile profile, or Wireless Mark-up Language (WML) to the devices. WML is an application of XML. WML is required due to the reduced capabilities of the WAP capable wireless devices as well as the constraints imposed by the low bandwidth wireless networks as compared to a personal computer with substantially more memory and processing power and accessing the Internet over higher speed connections.

Alternate embodiments are not constrained to WML. For example, future embodiments of WAP may be XHTML-based and not use WML or WMLScript may be replaced by some form of ECMAScript.

If the Web servers (203) provide WAP content, the WAP Proxy (201) retrieves it directly from the Web server (203). However, if the Web servers (203) provide Web content (such as HTML), the proxy (201) may translate the Web content into the WAP content. For example, the WAP proxy (201) could translate HTML into WML. The wireless device (100) then accesses the Web content from the WAP Proxy (201).

Figure 3:
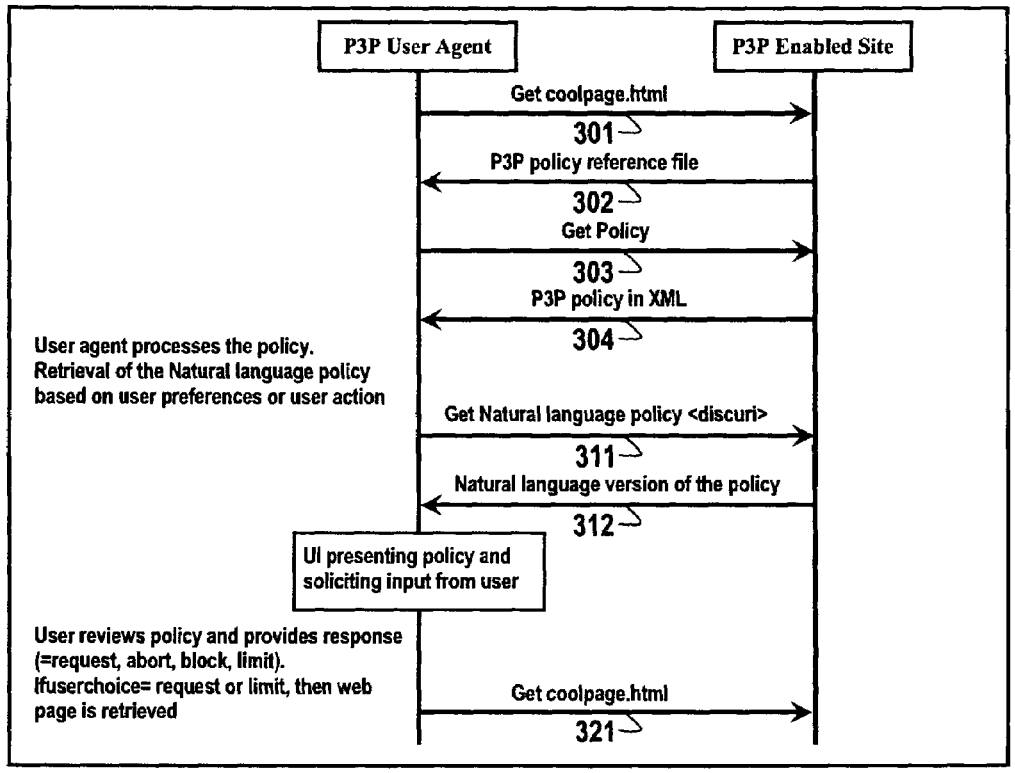
FIG. 3 shows a basic browsing mode process for retrieval of a P3P document.

The Web server (203) stores the natural language privacy policy that is accessed by both wireless devices and typical personal computers over the Internet. For purposes of clarity, only one Web server (203) is shown in FIG. 3. In reality, depending on the information required by the wireless device (100), multiple Web servers might be needed. Each Web server may reside at a different site and be operated by a different company. While the preferred embodiment illustrates the WAP Proxy (201) and Web server (203) as being separate entities, alternate embodiments include a WAP gateway function as part of the Web origin server serving the content.

A voice XML (VXML) gateway/proxy (207) may be included in the network. The VXML proxy (207) has a telephone number that the user can call for purposes of accessing and reviewing the privacy policy. In such an embodiment, the WAP portions of the network are not required since the VXML gateway (207) provides the interface to the Web server with the P3P policy (200) and the supporting servers (203).

The operation of the processes of the present invention will be illustrated with reference to the signal flow diagrams and flowcharts of FIGS. 3 8. These processes represent two possible scenarios: a browsing mode and a non-browsing mode.

In the browsing mode, the user wishes to access a Web site and retrieve a Web page and content or application. The user may or may not have visited the site previously. The site is P3P-enabled as is the user agent, as discussed above.

The user has set the preferences in his P3P user agent, such as through the APPEL rules, regarding conditions when he/she should be notified about the site's privacy policies. Automatic retrieval and processing of the XML policy then takes place. When the condition is triggered, the P3P user agent retrieves the natural language version of the privacy policy either automatically or at the explicit request of the user.

If the user agent is operating in the browsing mode, a basic retrieval operation takes place prior to the processes of the present invention. FIG. 3 illustrates the basic browsing process for retrieval of the P3P policy.

The process starts with the P3P-enabled user agent requesting a page (e.g., coolpage) from the P3P-enabled Web site. This may be accomplished with an HTTP Get command (301) such as "Get coolpage.html".

The Web site responds with the P3P policy reference file (302). The user agent then requests the XML version of the policy from the Web site (303) with another Get command. The Web site then responds with the XML policy (304).

The user agent then processes the policy and may need to retrieve the natural language version based on the preferences or a user action (e.g., key depression, voice command). If so, the user agent requests the natural language version of the policy by issuing a HTTP command such as "Get Natural Language Policy <discuri>" (311). As is well known in the art, the "discuri" parameter is the Universal Resource Locator (URL) at which the natural language policy resides. The Web site responds with the natural language version of the policy to the user agent (312).

In the non-browsing mode, the user is still connected and on-line but is not actively visiting the Website. However, he or she is carrying out an action such as bookmarking the site or programming the individual privacy settings for frequency accessed sites. In such an embodiment, the user is interacting with the P3P user agent without actively seeking content from the site. This scenario assumes that the P3P policy reference file is located and available at a well-known location on the provider's Web site.

Figure 4:
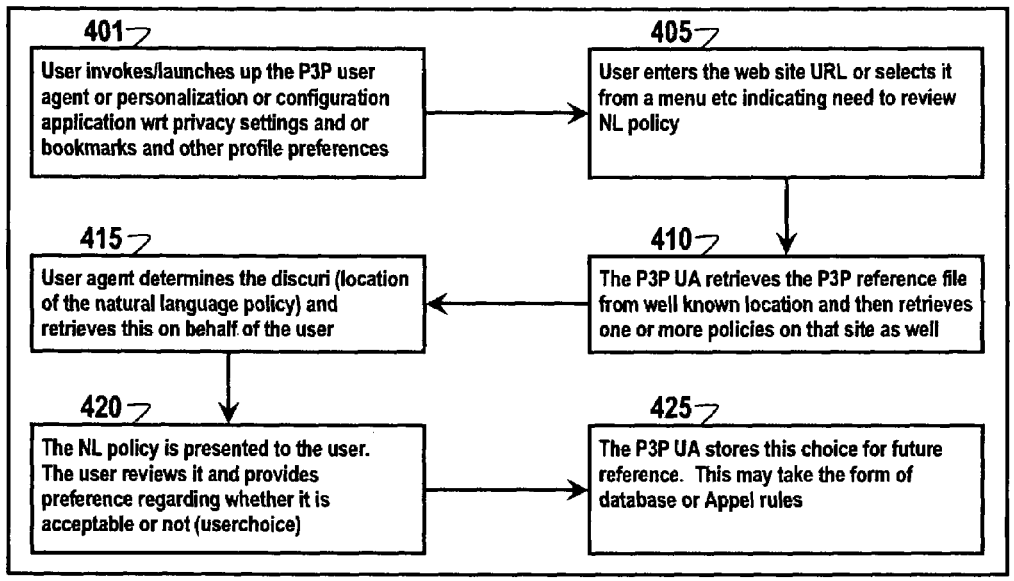
FIG. 4 shows a flowchart of a basic process used during a non-browsing mode.

FIG. 4 illustrates a flowchart of the basic process required during the non-browsing mode. This process starts when the user invokes the P3P user agent, a configuration/personalization application, bookmarks, or other profile preferences (step 401).

The user then enters the Web site's URL or selects it from the bookmark menu that indicates a need to review the natural language policy (step 405). The P3P user agent then retrieves the P3P reference file from the location and possibly one or more policies from that site (step 410). The user agent then determines the discuri parameter and retrieves the XML policy on behalf of the user (step 415).

The natural language policy is then presented to the user to allow the user to review it and decide whether it is acceptable (step 420). The P3P user agent stores this choice for future reference in the form of a database or APPEL rules (step 425).

Figure 5:
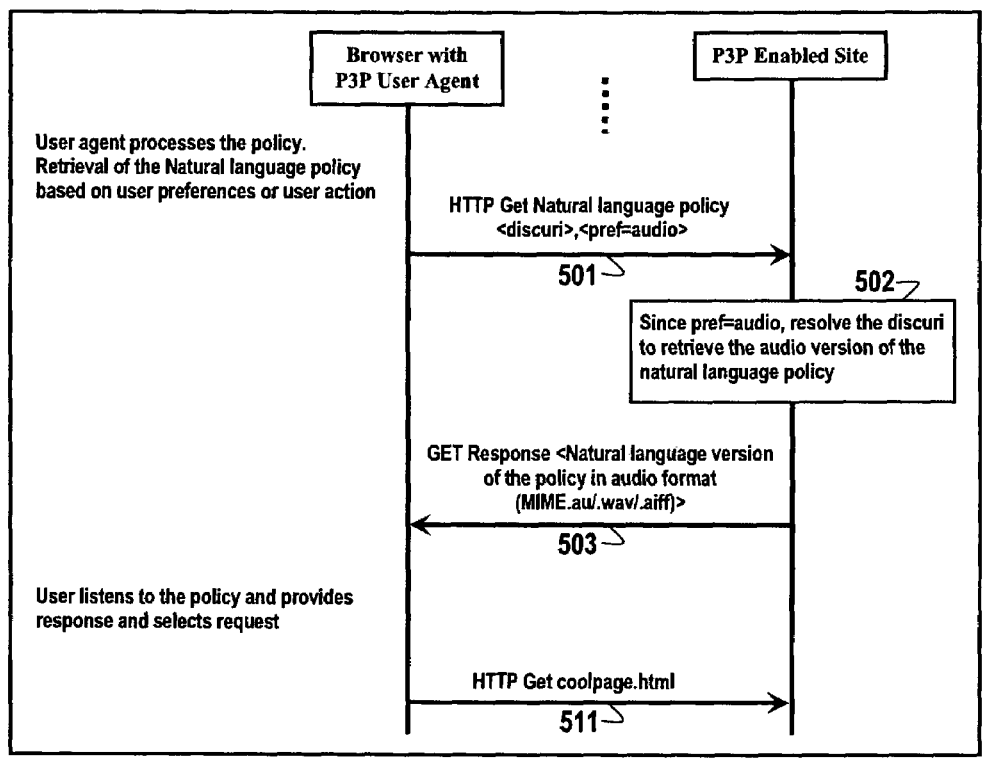
FIG. 5 shows a call flow diagram of one embodiment of a privacy policy review process of the present invention.

FIG. 5 illustrates a flow diagram of a natural language privacy policy review process of the present invention. This embodiment assumes that the user is accessing the Web site via a wireless device that supports Multimedia Internet Mail Extension (MIME) types such as "wav", "aiff", or "au" types that are well known in the art. This embodiment also assumes that the user has set his preferences to indicate that he prefers to listen to the policy as opposed to reading it. Thus, an example of an APPEL rule might be "pref=audio". Alternately, the preference may be set as part of a generic user profile that may or may not be associated with APPEL.

Preferably, the wireless device is accessing the Internet via a high bandwidth network that can support audio downloads with reasonable quality of service (QoS). An example of such a network is 2.5 and 3G CDMA networks.

The process begins after the P3P user agent has processed the XML version of the privacy policy. The user agent has thus decided, based on user preferences or user action, that the natural language policy is required.

Referring to FIG. 5, the user agent transmits a request for the natural language policy (501) to the P3P enabled Web site. Such a command might take the form of "HTTP Get Natural Language Policy <discuri>, <pref=audio>". As discussed above, the discuri parameter will be the URL at which the policy is located.

Since the preference has been set to audio, the Web site resolves the discuri to retrieve the audio version of the natural language policy (502). The Web site then responds to the Get command with the audio format of the policy (503). This format, in one embodiment, is in the MIME .au, .wav, or aiff format. Such a response might appear as "HTTP Get Response <Natural Language Version of the Policy in audio format>".

Once the wireless device's user agent has received the audio file, it is played for the user through the wireless device's audio system. The user is then provided an opportunity to respond. The user can respond by entering a response on the keypad of the wireless device, moving a cursor over a response on the display and depressing an enter key, or by a voice response to the wireless device that is then interpreted.

If the user agrees with the privacy policy and responds with a request to retrieve the Web content, a request is sent to the Web site for the desired content (511) (presuming the browsing mode). Such a request might be in the form of "HTTP Get coolpage.html" where "coolpage" is the desired Web page.

The user might also have the option of blocking access to personal information if he disagrees with the privacy policy. Additionally, the user might agree to allow a limited amount of personal information to be disclosed to the Web site, the details of which would likely have been pre-set.

The embodiment of FIG. 5 operates in either the browsing or non-browsing modes. In either mode, the Web site can return either the audio of the natural language policy (e.g., a normal voice transmission) or an audio file for playback by the user agent of the wireless device (e.g., a .wav file).

Figure 6:
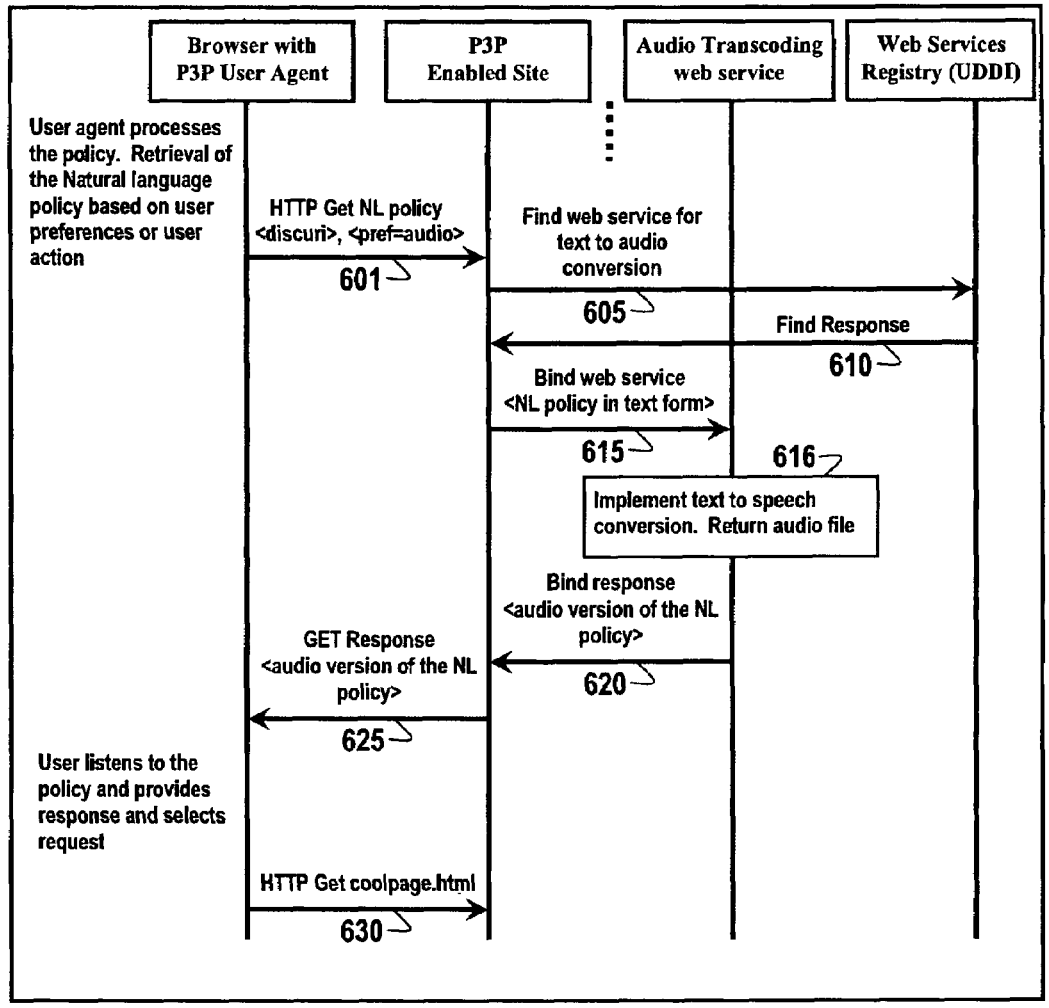
FIG. 6 shows a call flow diagram of a text-to-audio Web services embodiment of a privacy policy review process of the present invention.

FIG. 6 illustrates a flow diagram of a process for reviewing a privacy policy using Web services for text-to-audio conversion. As is well known in the art, Web services are a collection of functions that are packaged as a single entity and published to the network for use by other programs. The services are open distributed systems that allow companies and individuals to quickly and cheaply make their digital assets available worldwide. More information on Web services can be found at www.xml.com/pub/a/2001/04/04/webservices or http://msdn.microsoft.com/-library/default.asp?url=/library/enus/dnwebsrv/html/websvcs_platform.asp.

This embodiment relies on the same assumptions as the embodiment of FIG. 5 (i.e., high bandwidth connection, preference set to audio). However, in this embodiment, the Web site does not have an audio version of the policy. In this case, the Web server with the policy supports Web services protocols such as SOAP using XML over HTTP and WSDL that are well known in the art. It can query a Web services broker for information regarding a service provider that offers a Web service to convert the policy text file into an audio format.

The Web services broker typically hosts a registry with description of business and their services. This embodiment provides support for publishing and locating Web services such as the audio transcoding service (more information can be found at www.uddi.org). Thus the audio transcoding Web service provider will register with the service broker and published availability of its Web service. While the preferred embodiment of the present invention uses an audio transcoding server, other types of data conversions besides transcoding can be implemented.

Referring to FIG. 6, the user agent has processed the XML policy and needs to retrieve the natural language policy based on the user preferences or user action. The user agent sends a request to the P3P-enabled Web site (601). This command may take the form of "HTTP Get Natural Language Policy <discuri>, <pref=audio>".

The service requester (P3P Web site) then tries to find Web services for the text to audio conversion (605). This is request for the find service is sent to the Web services registry. This find process for a suitable Web service may occur at any time and even does not have to occur in real time. The Web services registry responds with the location to the Web site (610).

The service requester of the embodiment of FIG. 6 binds with the Web service by protocols such as SOAP (615). Depending on the Web service description, the discuri or the whole text of the natural language policy is communicated to the Web service. If the discuri is sent, the policy is first retrieved before the transformation takes place. In this case, no information about the user is sent to the Web service. The audio transcoding Web service implements the text-to-speech conversion process that returns an audio file (616).

The transformed content is returned to the service requester in a Bind response (620). Since this content is not in the XML format, additional packaging of the message using MIME may be necessary in the SOAP response.

The Web site sends the audio version of the natural language policy to the user agent (625). This may be done in a Get response command such as "Get Response <audio version of Natural Language Policy>". The user agent then plays the policy for the user and waits for a response from the user. This display and response might take the form of the display of FIG. 6 or some other type of display and response. In this case, the user agent responds with an "HTTP Get coolpage.html" command (630) to the Web site in order to retrieve the Web content "coolpage".

Figure 7:
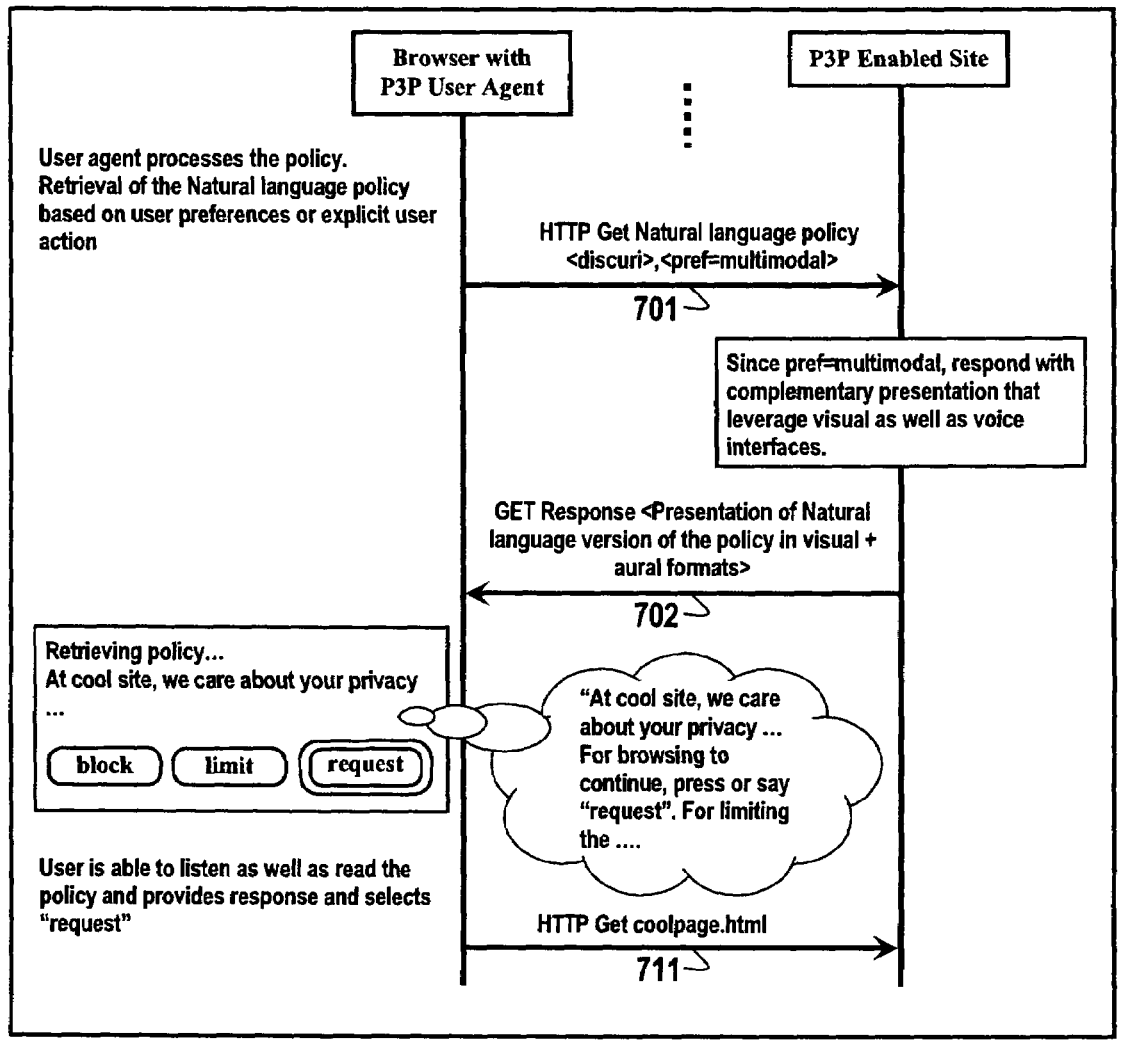
FIG. 7 shows a call flow of a multi-modal interface embodiment of a privacy policy review process of the present invention.

FIG. 7 illustrates a multi-modal interface process of the present invention. In this embodiment, the user is accessing the Web site via a multi-modal wireless device. In this instance, multi-modal refers to the user agent supporting voice as well as data simultaneously for input and output on a user interface The P3P preferences of this embodiment are set to multi-modal (i.e., <pref=multimodal>).

The process begins after the user agent has processed the XML version of the policy. Based on user preferences or user action, the natural language version is required.

The user agent transmits a request to the P3P-enabled Web site for the natural language policy (701). This could be in the form of a Get command such as "HTTP Get Natural Language Policy <discuri>, <pref=multimodal>".

The Web site server is able to parse the user preference that indicates review of the natural language policy by visual as well as audio interface. The server resolves the discuri parameter in order to respond. Since the preferences are set to multi-modal, the Web site will respond with content that leverages visual as well as audio interfaces. This response (702) may be in the form of a Get response such as "Get Response <presentation of Natural Language Version of the Policy in visual+aural formats>". In one embodiment, the response involves XML-based technologies.

The user is now able to listen as well as read the policy and provide a response. The response may be, as indicated in the previous embodiments, a voice or text entry. If the user has responded that she agrees with the policy, the desired content from the Web site is retrieved with a command such as "HTTP Get coolpage.html" (711).

Figure 8:
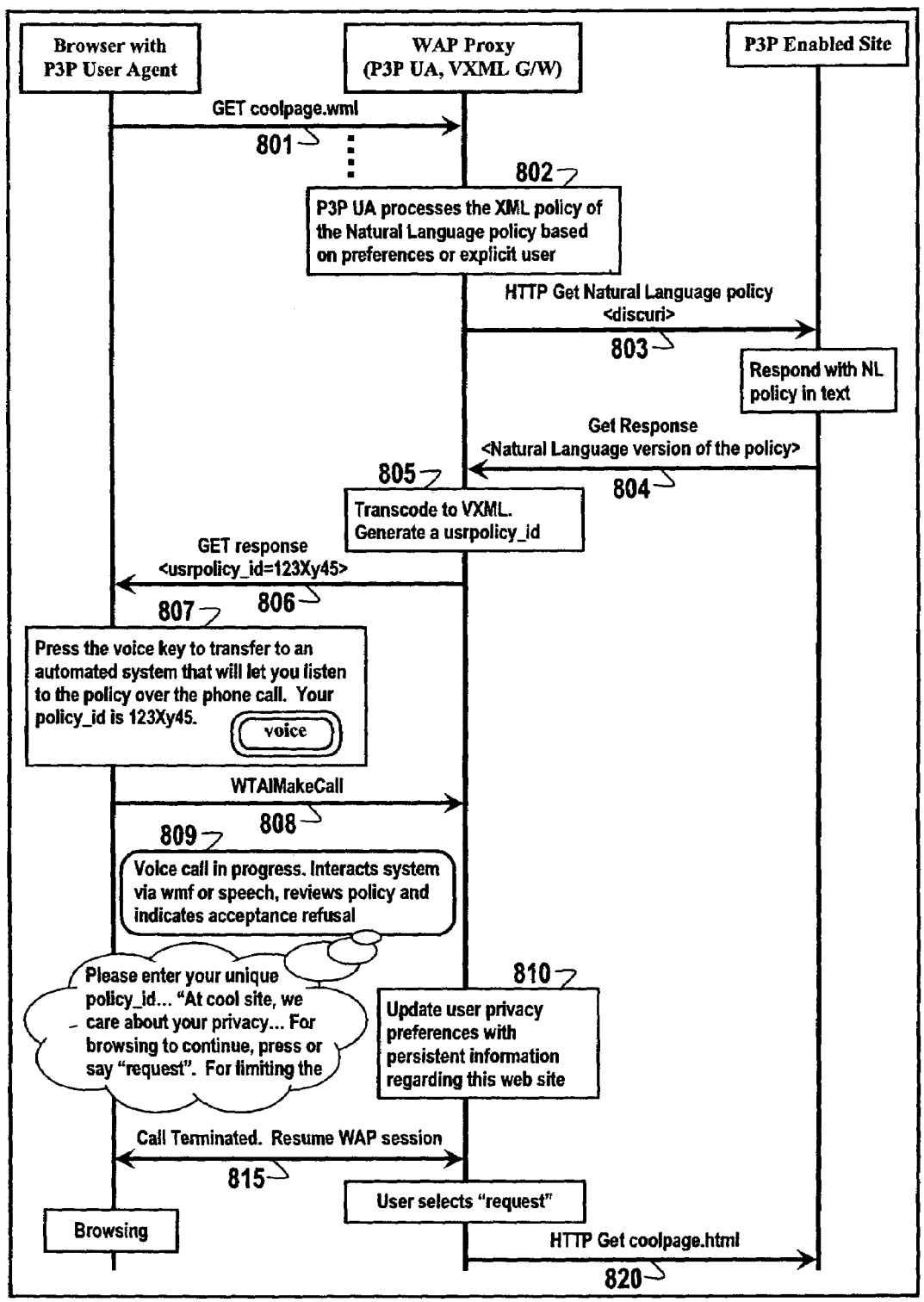
FIG. 8 shows a call flow of a trusted WAP enhancing proxy embodiment of a privacy policy review process of the processes of the present invention.

FIG. 8 illustrates an embodiment of the processes of the present invention in which a trusted WAP enhancing proxy is used as both a P3P user agent and a VXML user agent. The trusted WAP-enabled proxy is a proxy with which the user agent has a relationship such as the user's APPEL preferences are stored on the WAP proxy and the APPEL evaluator function is implemented in the proxy.

In this embodiment, the user is accessing the Web site via a wireless device that has limited processing capabilities such as a WAP-enabled wireless device. The wireless device has a WAP browser and the network infrastructure is comprised of a WAP-compatible architecture.

Additionally, the WAP proxy of the embodiment of FIG. 8 acts as a voice XML (VXML) gateway that supports functions such as the ability to traverse VXML Web pages and carrying out text-to-speech conversion. The WAP proxy, acting as a VXML gateway, also performs speech and/or DTMF recognition. The wireless mobile station accesses the VXML capabilities via a public switched telephone network (PSTN) voice call.

In this embodiment, the WAP proxy supports specialized transcoding functions that enable conversion of the human readable policy obtained from the Web server into VXML-compatible format. Alternately, the WAP proxy may convey user preferences for review of the policy in VXML format to the origin server that may itself be capable of rendering the policy in such a format.

Referring to FIG. 8, the process begins with the user agent transmitting a command to the WAP proxy/VXML gateway for a Web page (801). This command may take the form of "HTTP Get coolpage.wml".

The P3P user agent at the WAP proxy processes the XML policy and retrieves the natural language policy based on user preferences or user action (802). The natural language policy is then retrieved from the P3P-enabled Web site (803) that stores the policy. This command may take the form of "HTTP Get Natural Language Policy <discuri>".

The Web site with the policy then responds to the WAP proxy with the natural language policy (804). This response may take the form of "Get Response <natural language version of the policy>".

The WAP proxy/VXML gateway then transforms the natural language policy to VXML and generates a user policy identification number. The user policy ID is transmitted back to the user agent in the wireless device (806). The policy ID associates a particular natural language policy with a certain user since there may be multiple users simultaneously requiring transformed natural language policies.

The process does not require text-to-speech conversion first and then generate the policy ID. It could simply generate the policy ID and perform the text-to-speech transformation in real time.

The use agent then invokes a Wireless Telephony Application Interface (WTAI) Make Call function (i.e., a WMLScript public library function) to set up a voice call between the wireless device and the WAP proxy/VXML user agent. This call may be set up automatically without user intervention or the user agent may display a prompt that lets the user respond whether they want the call set up and also displays the user policy ID (807).

Once the PSTN call is set up (808) with the WAP proxy/VXML gateway, the user policy ID is entered. This policy ID is used to associate the user with the policy that he has chosen to hear. The user then listens to the policy over the PSTN voice call. The user can respond (809) with their decision to the policy via speech entry or DTMF tones. The user preferences in the P3P user agent on the WAP proxy are then updated accordingly (810). The WAP session resumes after the voice call is terminated (815). If the policy was acceptable, the WAP proxy can generate the request for content to the Web site on behalf of the user (820). This command may take the form of "HTTP Get coolpage.html".

Figure 9:
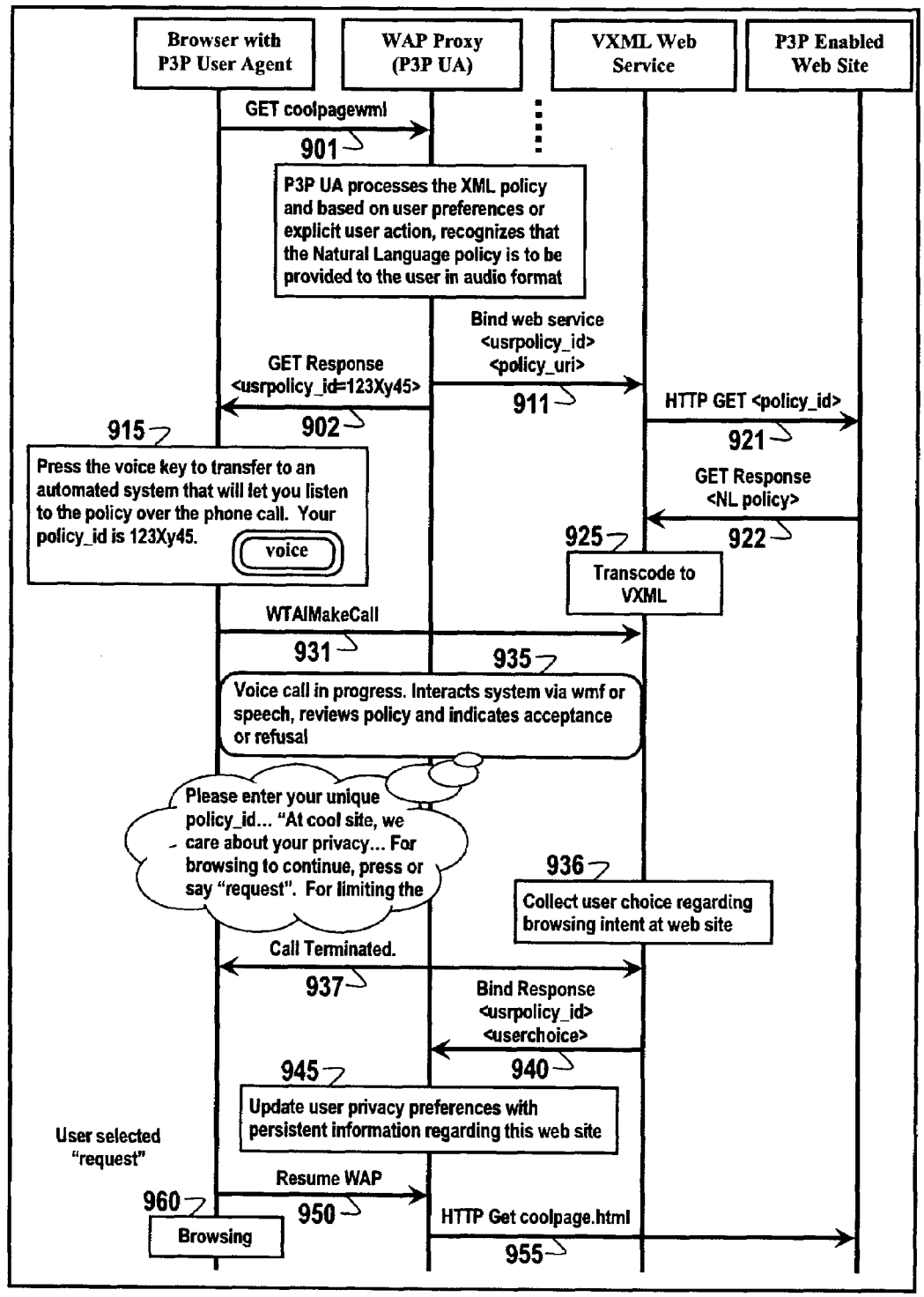
FIG. 9 shows a call flow of a voice browsing Web service embodiment of a privacy policy review process of the present invention.

FIG. 9 illustrates an embodiment of the present invention where a WAP proxy invokes the voice browsing Web service. In this embodiment, the user is accessing the Web site with a wireless device that has limited processing capabilities, such as a WAP-enabled device. The network infrastructure is comprised of a WAP-compatible architecture.

In this embodiment, the P3P user agent functionality is implemented in the WAP/enhancing proxy in which the wireless device user agent has a trusted relationship. Such a relationship indicates that the wireless device user agent stores its APPEL preferences on the WAP proxy and the APPEL evaluator function is implemented in the proxy.

The P3P user agent of this embodiment manages the privacy user interface with the wireless device. In other words, the P3P user agent may be a WML or XHTML application downloadable from a proxy that, in this embodiment, is a Wireless Telephony Application (WTA) server. The WTA server is a special kind of origin server that communicates with a WAP wireless device directly. The WTA server provides WAP access to features of the wireless network provider's telecommunications infrastructure. For example, the network provider may provide storage of telephone numbers and addresses for the telephone user. The user can then access these numbers through the WA server using the wireless device's user agent.

Since the user in the embodiment of FIG. 9 has expressed a preference to review the policy by listening to it and the P3P Web site has the capability of providing the policy in visual form, the enhancing proxy communicates with the Web service provider to provide the necessary function for the user. SOAP or some other messaging protocol is used for communication between the proxy and the Web service. Depending on the Web services provided, either the discuri or the natural language policy is communicated to the Web service. If the discuri is transmitted, the policy is retrieved by the Web service. If the policy is sent as a whole to the Web service, the proxy should retrieve the same before invoking the Web service.

In this embodiment, the Web service supports functions such as the ability to perform text-to-speech conversion and/or speech recognition, generate VXML compatible Web pages, and/or traverse them. The interface for this embodiment is provided by a call generated over the PSTN or voice over IP (VoIP) call.

Referring to FIG. 9, the process begins with the wireless device's user agent requesting Web content with a command such as "Get coolpage.wml" (901). This command is transmitted to the WAP proxy (P3P user agent).

The P3P user agent in the WAP proxy then processes the XML policy and, based on user preferences or user action, recognizes that the natural language policy is to be provided to the user in audio format. The WAP proxy user agent then binds with the VXML Web service (911). This can be accomplished with a command such as "Bind Web Service <usrpolicy_id>, <policyURI>". The policyURI is essentially the discuri parameter identified by the Web site. In another embodiment, the natural language policy could be retrieved and sent in place of the policy URL that the Web service has to retrieve from the Web site.

The WAP proxy user agent also responds to the wireless device's user agent with the user policy ID number (902). This can be accomplished by the command "Get Response <usrpolicy_id=123XY45>". As in the previous embodiment, the wireless device's user agent then either automatically initiates a call to the VXML Web Services or prompts the user to initiate the call (915).

The VXML retrieves the policy from the P3P-enabled Web site if necessary (921). This may be accomplished with a command such as "HTTP Get <policy_id>". The Web site then responds with the natural language policy in a response such as "Get Response <Natural Language Policy>" (922).

The VXML Web service transcodes the natural language policy to VXML (925). The wireless device's user agent then invokes a WTAI Call with the VXML Web Services (931).

With the voice call in progress to the VXML server, the user can then express her opinion by DTMF tones or by speech in order to accept or refuse the policy (935). The VXML Web service collects the user's choice regarding the policy (936). The voice call may be terminated (937).

The VXML Web service responds to the WAP proxy/P3P user agent with a Bind response (940). This response may take the form of "Bind Response <usrpolicy_id>, <userchoice>" where the user policy ID and the user's response are transmitted back to the WAP proxy. The WAP proxy then updates the user privacy policy preferences with persistent information regarding the Web site (945).

The WAP session may then resume (950) between the wireless device's user agent and the WAP proxy. The process for resuming a WAP session is well known in the art. The WAP proxy transmits the request (955) for the Web content to the Web site storing the content. This request may take the form of "HTTP Get coolpage.wml". The user can then resume her browsing (960).

Figure 10:
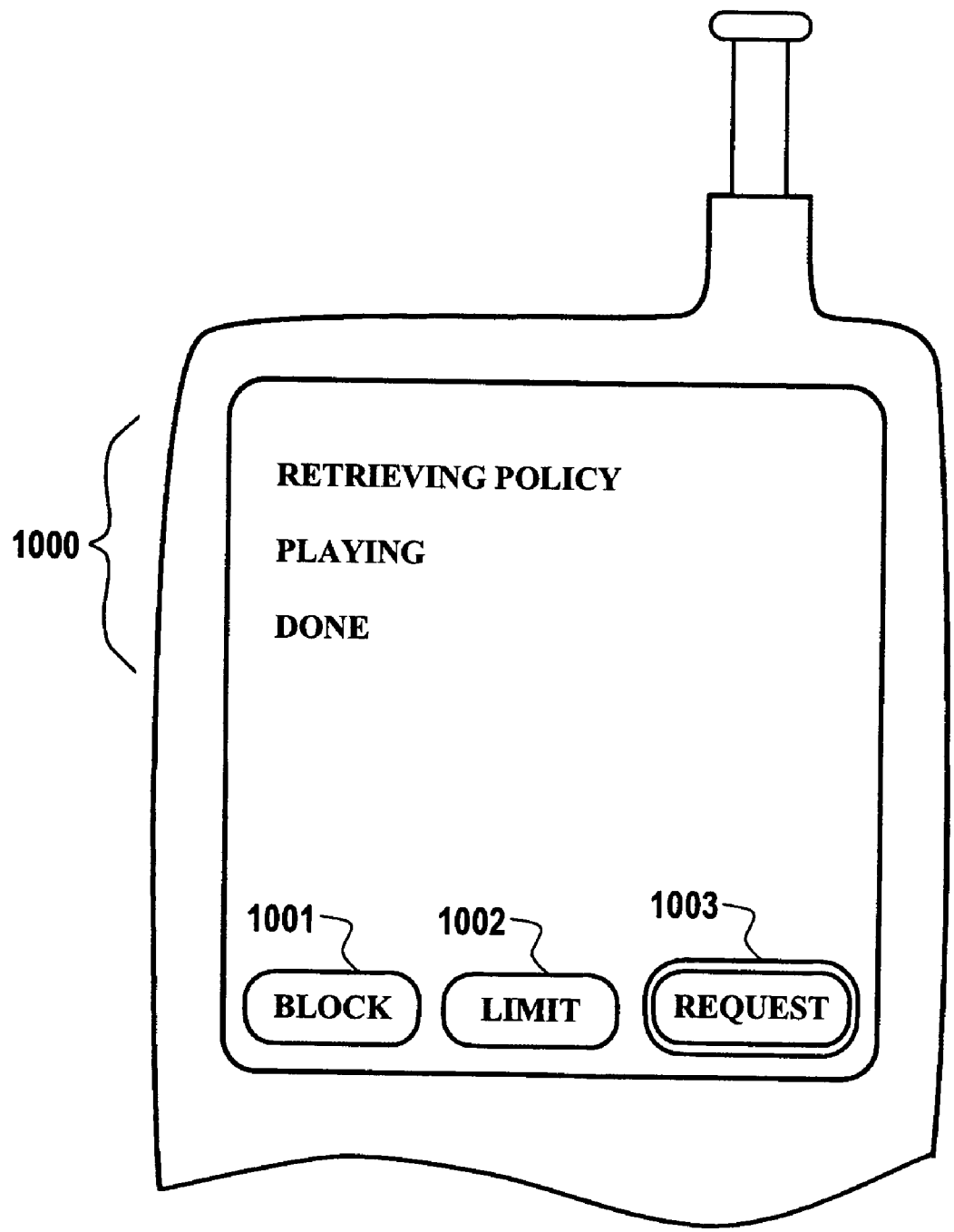
FIG. 10 shows an example of a wireless device display in accordance with the present invention.

An example of a wireless device's display in accordance with the processes of the present invention is illustrated in FIG. 10. The display might initially show the status of the process (1000) such as "Retrieving Policy", "Playing Policy", and "Done". The display might also have response buttons (1001 1003) that can be highlighted by the user with the cursor control button on the keypad. These responses, in one embodiment, are "block" (1001), "limit" (1002), and "request" (1003). Once the desired response has been highlighted or selected, the enter key on the keypad is depressed to indicated the user's choice. The display might also indicate when it is waiting for a voice response by the user.

The display of FIG. 10 is for purposes of illustration only. The present invention is not limited to any one display or type of response.

In summary, the present invention provides a wireless mobile station's user with the ability to review natural language versions of an Internet site's privacy policy, wherein the review is accomplished by allowing the user to review the policy via an aural means. Thus, the limited display capabilities of wireless devices will not obstruct the user's ability to review long, natural language pages.

The invention claimed is:

1. A method for aural review of a privacy policy, the method comprising the steps of:

retrieving a first version of a privacy policy comprising a network location;

retrieving, from the network location, a natural language version of the privacy policy that is stored in audio format at the network location identified in the first version of the privacy policy after retrieving the first version of the privacy policy based on at least one user preference; and playing an audio representation of the natural language version of the privacy policy through an audio system of a device.

2. The method of claim 1, further comprising:

requesting an input in response to the natural language version of the privacy policy.

3. The method of claim 1, wherein the first version of the privacy policy is an extensible mark-up language version of the privacy policy.

4. A computer readable storage medium comprising a set of instructions for aural review of a privacy policy, the set of instructions to direct a processor to perform acts of:

retrieving a first version of a privacy policy comprising a network location;

retrieving, from the network location, a natural language version of the privacy policy that is stored in audio format at the network location identified in the first version of the privacy policy after retrieving the first version of the privacy policy based on at least one user preference; and playing an audio representation of the natural language version of the privacy policy through an audio system of a device.

5. The computer readable storage medium of claim 4, further comprising a set of instructions to direct a processor to perform acts of:

requesting an input in response to the natural language version of the privacy policy.

6. A system for providing aural review of a privacy policy comprising:

a server operative to:

receive a first version of a privacy policy comprising a network location, retrieve, from the network location, a natural language version of the privacy policy that is stored in audio format at the network location identified in the first version of the privacy policy after retrieving the first version of the privacy policy based on at least one user preference, and play an audio representation of the natural language version of the privacy policy through an audio system of a device.

7. The system of claim 6, wherein the server is further operative to request an input in response to the natural language version of the privacy policy.

8. A method for aural review of a privacy policy, the method comprising the steps of:

retrieving a first version of a privacy policy comprising a network location;

retrieving, from the network location, a natural language version of the privacy policy that is stored in audio format at the network location identified in the first version of the privacy policy after retrieving the first version of the privacy policy based on at least one user preference; and transmitting the natural language version of the privacy policy in an audio format to a device.

9. The method of claim 8, further comprising:

playing the natural language version of the privacy policy at the device.

10. The method of claim 8, further comprising:

requesting an input in response to the natural language version of the privacy policy.

11. The method of claim 8, wherein the first version of the privacy policy is an extensible mark-up language version of the privacy policy.

12. A computer readable storage medium comprising a set of instructions for aural review of a privacy policy, the set of instructions to direct a processor to perform acts of:

retrieving a first version of a privacy policy comprising a network location;

retrieving, from the network location, a natural language version of the privacy policy that is stored in audio format at the network location identified in the first version of the privacy policy after retrieving the first version of the privacy policy based on at least one user preference; and transmitting the natural language version of the privacy policy in an audio format to a device.

13. The computer readable storage medium of claim 12, further comprising a set of instructions for:

requesting an input in response to the natural language version of the privacy policy.

14. A system for providing aural review of a privacy policy comprising:

a server operative to:

retrieve a first version of a privacy policy comprising a network location, retrieve, from the network location, a natural language version of the privacy policy that is stored in audio format at the network location identified in the first version of the privacy policy after retrieving the first version of the privacy policy based on at least one user preference, and transmit the natural language version of the privacy policy in an audio format to a device.

15. The system of claim 14, wherein the server is further operative to request an input in response to the natural language version of the privacy policy.

\* \* \* \* \*